(12) United States Patent
Prebil

(10) Patent No.: US 11,034,186 B1
(45) Date of Patent: Jun. 15, 2021

(54) PUMPKIN DISPLAY SYSTEM AND METHOD

(71) Applicant: Joseph Prebil, Eagle, WI (US)

(72) Inventor: Joseph Prebil, Eagle, WI (US)

( * ) Notice: Subject to any disclaimer, the term of this patent is extended or adjusted under 35 U.S.C. 154(b) by 0 days.

(21) Appl. No.: 16/680,090

(22) Filed: Nov. 11, 2019

Related U.S. Application Data

(60) Provisional application No. 62/773,270, filed on Nov. 30, 2018.

(51) Int. Cl.
| | | |
|---|---|---|
| *B44C 5/06* | (2006.01) | |
| *F16M 11/00* | (2006.01) | |
| *F16M 11/22* | (2006.01) | |
| *F16M 13/02* | (2006.01) | |

(52) U.S. Cl.
CPC ............ *B44C 5/06* (2013.01); *F16M 11/00* (2013.01); *F16M 11/22* (2013.01); *F16M 13/02* (2013.01)

(58) Field of Classification Search
USPC .................. 248/127, 158, 163.1, 164, 431
See application file for complete search history.

(56) References Cited

U.S. PATENT DOCUMENTS

| | | | | |
|---|---|---|---|---|
| 858,389 | A | * | 7/1907 | Hess |
| 906,577 | A | * | 12/1908 | Thomson |
| 2,922,608 | A | * | 1/1960 | Heuer .............. A47J 43/28 248/167 |
| 5,678,824 | A | * | 10/1997 | Fortier .............. F41J 1/10 273/400 |
| D520,405 | S | * | 5/2006 | Prebil .................. D11/121 |
| 2012/0240458 | A1 | * | 9/2012 | Ganske ............. A01G 27/005 47/39 |

* cited by examiner

*Primary Examiner* — Alfred J Wujciak
(74) *Attorney, Agent, or Firm* — Michael A. Bondi; Moss & Barnett

(57) ABSTRACT

A pumpkin display system including a plurality of legs, a central hub and a pumpkin. The central hub has a plurality of apertures formed therein. Each of the apertures is adapted to receive an end of one of the legs to form a pumpkin display. The pumpkin is placed onto and is supported by the pumpkin display to form the pumpkin display system.

19 Claims, 6 Drawing Sheets

PUMPKIN DISPLAY SYSTEM AND METHOD

REFERENCE TO RELATED APPLICATION

This application claims priority to Provisional Applic. No. 62/773,270, filed on Nov. 30, 2018, the contents of which are incorporated herein by reference.

FIELD OF THE INVENTION

The invention relates generally to display systems. More particularly, the invention relates to a system and method for displaying a pumpkin.

BACKGROUND OF THE INVENTION

Pumpkins are typically displayed in conjunction with Halloween. The pumpkins are frequently carved or otherwise decorated to enhance the appearance of the pumpkin. The decorated pumpkins are typically displayed on a ground surface, which limits the ability to see aspects of the decorated pumpkin.

SUMMARY OF THE INVENTION

An embodiment of the invention is directed to a pumpkin display system having a plurality of legs, a central hub and a pumpkin. The central hub has a plurality of apertures formed therein. Each of the leg apertures is adapted to receive an end of one of the legs to form a pumpkin display. The pumpkin is placed onto and supported by the pumpkin display to form the pumpkin display system.

Another embodiment of the invention is directed to a method of forming a pumpkin display system. A central hub is provided having a plurality of apertures formed therein. A plurality of legs are provided. The end of each leg is extended into one of the plurality of aperture to form a pumpkin display. A pumpkin is placed on the pumpkin display. The pumpkin display supports the pumpkin above a surface on which the pumpkin display is placed.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
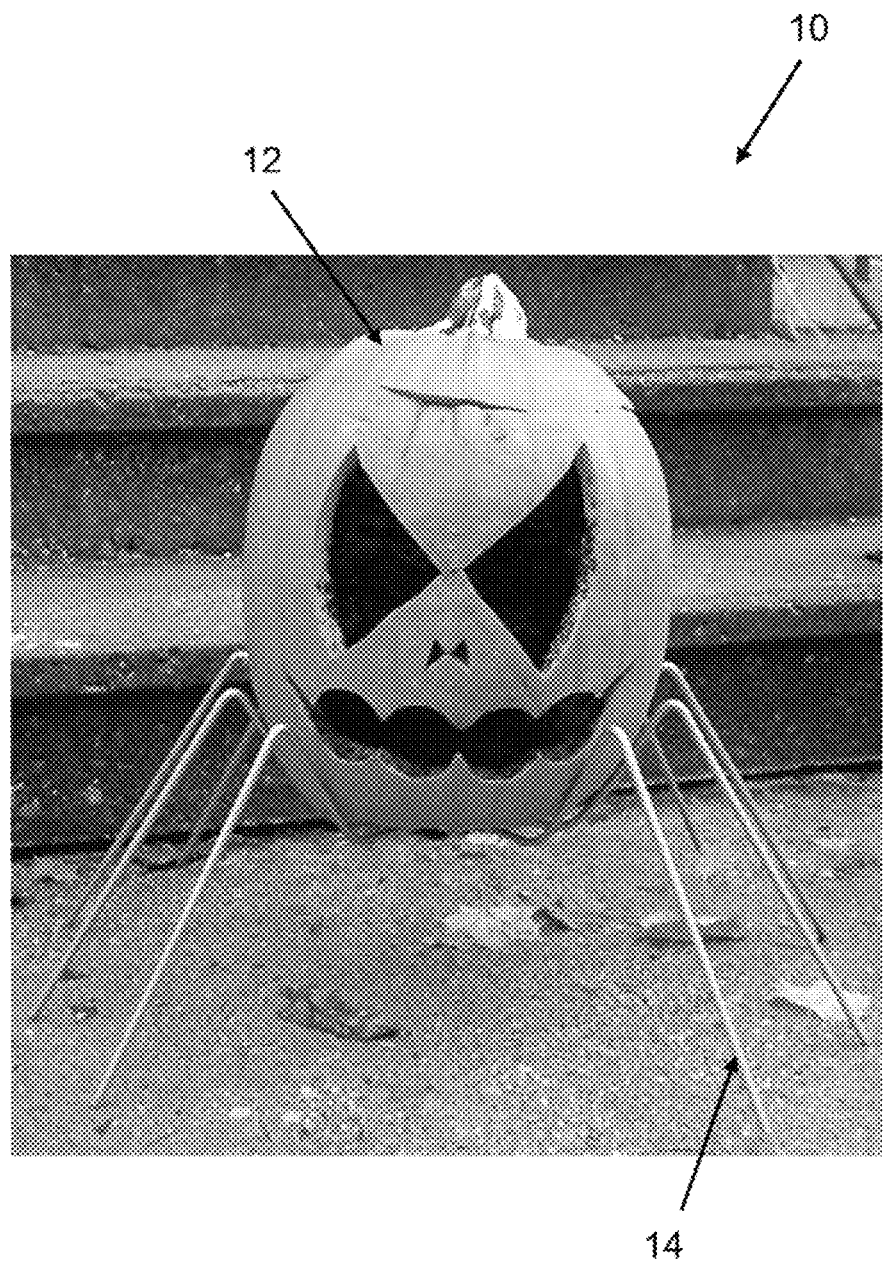
FIG. 1 is a front perspective view of a pumpkin display system that includes a pumpkin and a pumpkin display.

An embodiment of the invention is directed to a pumpkin display system, which is illustrated in FIG. 1, and a method of using the pumpkin display system. The pumpkin display system 10 generally includes a pumpkin 12 and a pumpkin display 14.

The pumpkin display 14 may be used in conjunction with the pumpkin 12 having a variety of shapes and sizes. In certain embodiments, the pumpkin 12 has a generally spherical shape and has a diameter of between about 8 inches and about 16 inches.

Figure 2:
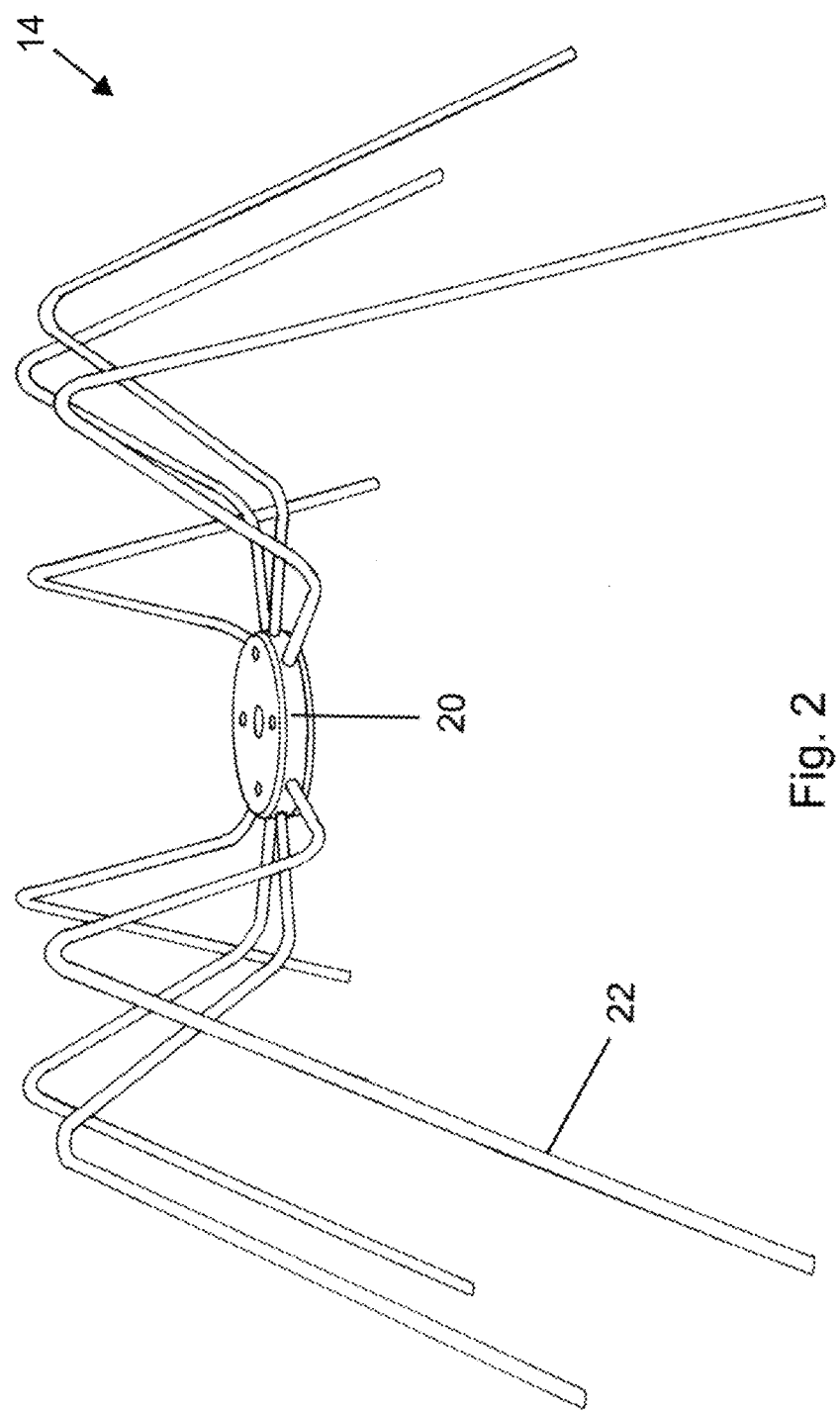
FIG. 2 is a front perspective view of the pumpkin display in an assembled configuration.
Figure 3:
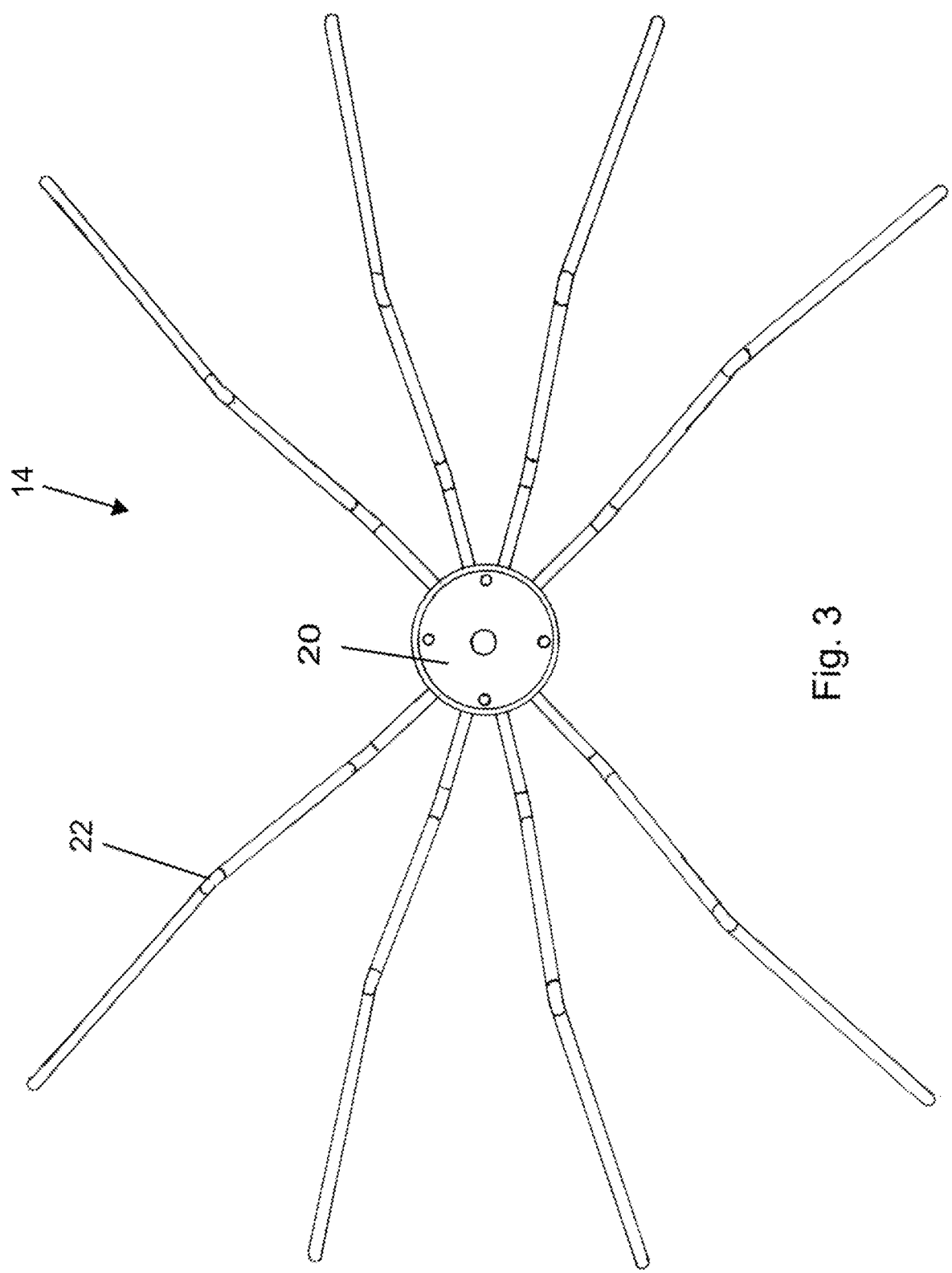
FIG. 3 is a top view of the pumpkin display in the assembled configuration.
Figure 4:
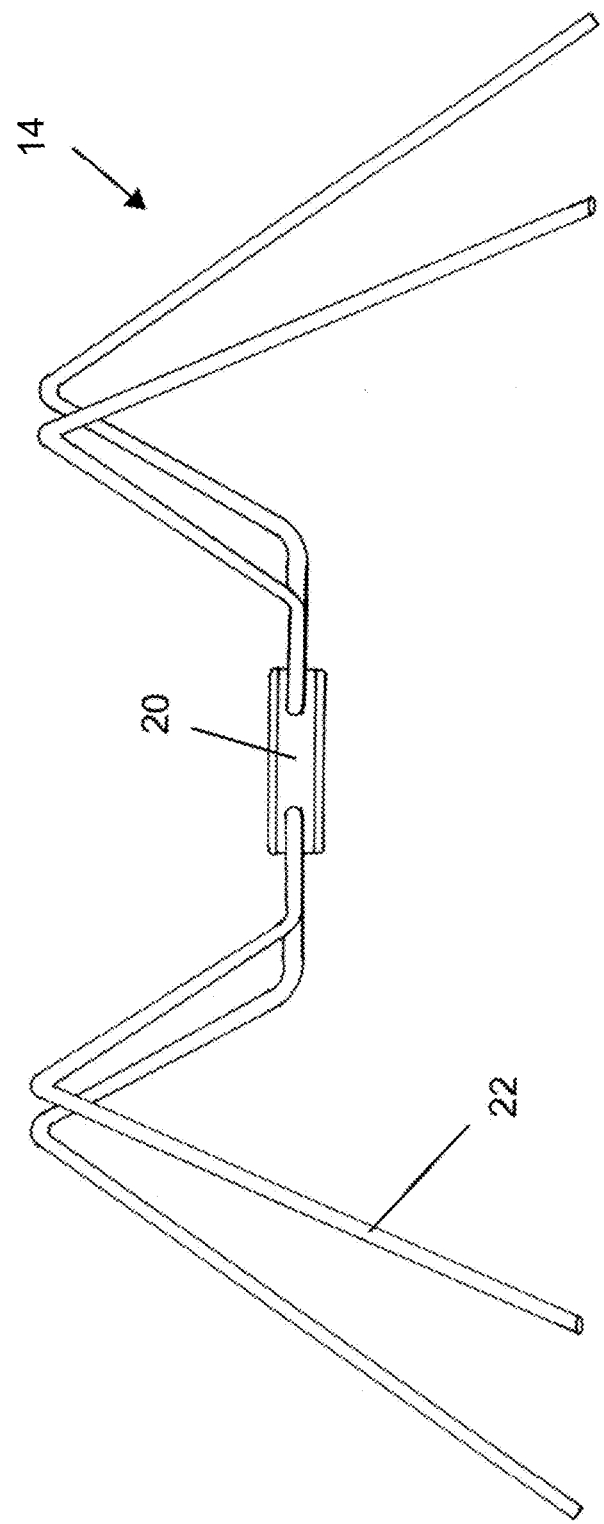
FIG. 4 is a front view of the pumpkin display in the assembled configuration.
Figure 5:
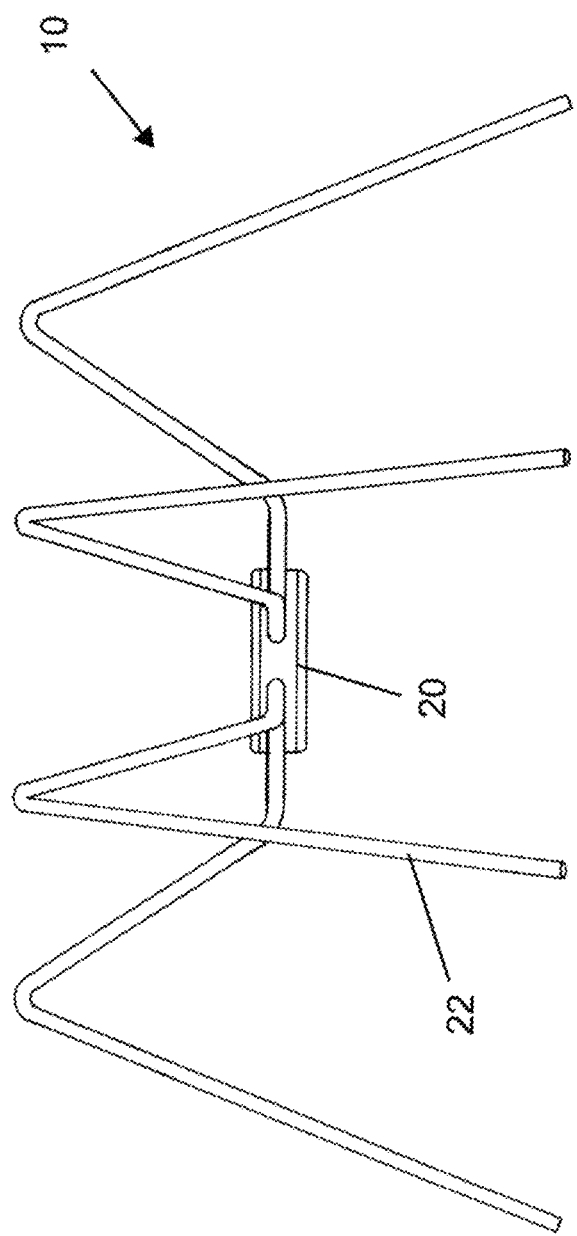
FIG. 5 is a side view of the pumpkin display in the assembled configuration.

The pumpkin display 14 generally includes a central hub 20 and a plurality of legs 22 extending therefrom as illustrated in FIGS. 2-4. While it is illustrated that the pumpkin display includes eight legs 22, a person of skill in the art will appreciate that the invention may be adapted for use with other numbers of legs 22.

The central hub 20 may be fabricated from a variety of materials using the concepts of the invention. The material used to fabricate the central hub 20 should substantially resist deformation when the pumpkin 12 is placed on the pumpkin display 14. The material used to fabricate the central hub 20 should resist degradation such as when the pumpkin display is used in outside environments. An example of one material that may be used to fabricate the central hub 20 is plastic.

Alternatively, the central hub 20 may deform when the pumpkin 12 is placed on the pumpkin display 14 to allow a portion of the legs 22 to contact the surface of the pumpkin 12 to thereby retain the pumpkin 12 in a substantially stationary position with respect to the pumpkin display 14. As used herein, substantially stationary means that the pumpkin 12 is restricted in the ability to move with respect to the pumpkin display 14.

Figure 7:
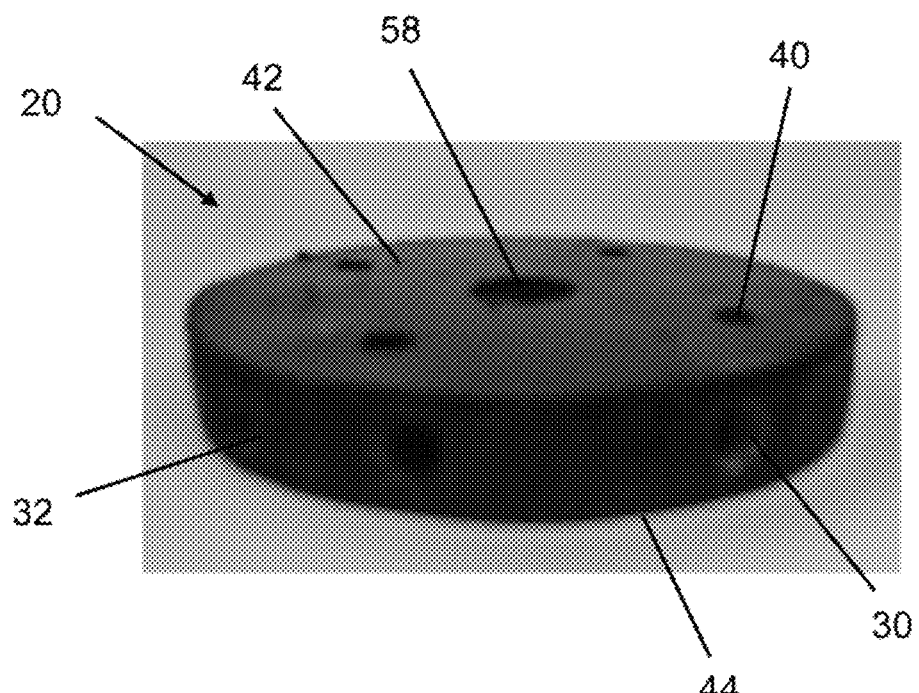
FIG. 7 is a perspective view of a central hub of the pumpkin display.

In certain embodiments, the central hub 20 may have a generally circular shape as illustrated in FIG. 7. A plurality of leg apertures 30 are formed in the central hub 20. The leg apertures 30 may extend through a side surface 32 of the central hub 20. When the pumpkin display system 30 includes eight legs 22, the leg apertures 30 may be arranged such that four of the legs extend from a first side of the central hub 20 and four of the legs 22 extend from a second side of the central hub 20 that is opposite the first side of the central hub 20.

In certain embodiments, the legs 22 that extend from the first side of the central hub 20 are generally symmetrical to the legs 22 that extend from the second side of the central hub 20. An angle between each set of adjacent legs 22 on each side of the central hub 20 may be approximately equal. In certain embodiments, the angle is between about 20 degrees and about 40 degrees. In other embodiments, the angle is about 30 degrees.

All of the leg apertures 30 may be oriented at a similar orientation with respect to at least one of the upper surface and the lower surface of the central hub 20. In certain embodiments, the leg apertures 30 are oriented substantially parallel to at least one of the upper surface and the lower surface of the central hub 20. As used herein, substantially parallel means that an angle between the leg aperture 30 and the upper surface or the lower surface is less than about 5 degrees.

Each of the leg apertures 30 may be formed with a generally cylindrical shape. A diameter of the leg apertures 30 may be slightly smaller than the diameter of the end portion of the leg 22 that is extended into the leg aperture 30. This configuration thereby minimizes the potential of the leg 22 rotating after being inserted into the leg aperture 30 because of the friction between the surface of the leg aperture 30 and the surface of the leg 22 that is inserted into the leg aperture 30.

At least one of the leg aperture 30 and the end portion of the leg 22 that is extended into the leg aperture 30 may have an enhanced friction surface to further reduce the potential of the leg 22 rotating after being inserted into the leg aperture 30. An example of the enhanced friction surface is an irregular texture.

In another embodiment, the leg apertures 30 are formed with a non-circular shape, examples of which include square, rectangular and oval. The end portion of the leg 22 has a shape that is similar to the shape of the leg aperture 30. Such a configuration prevents the leg 22 from rotating after being inserted into the leg aperture 30.

The central hub 20 may also include at least one mounting aperture 40 that extends from an upper surface 42 thereof to a lower surface 44 thereof. The at least one mounting aperture 40 is adapted to receive a fixation device that is used for attaching the pumpkin 12 to the pumpkin display 14.

An example of one suitable fixation device is a string or wire that extends through the at least one mounting aperture 40 and an aperture (not shown) in the pumpkin 12 to retain the pumpkin 12 in a substantially stationary position with respect to the pumpkin display 14. As used herein, substantially stationary means that the pumpkin 12 is retained on the pumpkin display 14 when the pumpkin display system 10 is in use such as illustrated in FIG. 1. It is also possible for the fixation device to be a screw or bolt that is used in conjunction with a nut and potentially also a washer.

Each of the legs 22 may have a similar shape and size. Using such a configuration enhances the ability to quickly assemble the pumpkin display system 10 because it is not necessary to determine which leg 22 goes into which leg aperture 30.

The legs 22 may be fabricated from a variety of materials using the concepts of the invention. The material used to fabricate the legs 22 should have sufficient structural rigidity so that the legs 22 resist deformation when the pumpkin 12 is placed on the pumpkin display 14.

In certain embodiments, the legs 22 are fabricated from a metallic material such as steel. The steel rod that is used to fabricate the legs 22 may have a diameter of about 0.25 inches. The steel rod may be coated to enhance the ability of the steel rod to resist degradation such as when the pumpkin display 14 is anticipated to be used in outside environments.

The legs 22 may be formed in three leg sections 50, 52, 54 that are oriented at an angle with respect to each other. The first leg section 50 may be shorter than the second leg section 52 and the second leg section 52 may be shorter than the third leg section 54.

In certain embodiments, the second leg section 52 may be about two times longer than the first leg section 50 and the third leg section 54 may be about two times longer than the second leg section 52. In other embodiments, the first leg section 50 has a length of about 3 inches, the second leg section 52 has a length of about 5 inches and the third leg section 54 has a length of about 11 inches. Using this configuration, the overall length of the material used to fabricate the leg 22 has a length of about 19 inches.

An angle between the first leg section 50 and the second leg section 52 is between about 100 degrees and about 140 degrees. In other embodiments, the angle between the first leg section 50 and the second leg section 52 is about 120 degrees.

An angle between the second leg section 52 and the third leg section 54 is between about 40 degrees and about 80 degrees. In other embodiments, the angle between the second leg section 52 and the third leg section 54 is about 64 degrees.

Providing the first leg section 50, the second leg section 52 and the third leg section 54 with the preceding sizes and orientations with respect to each other causes the central hub 20 to be support above a ground surface when the ends of the legs 22 opposite the central hub 20 are on the ground surface.

Figure 6:
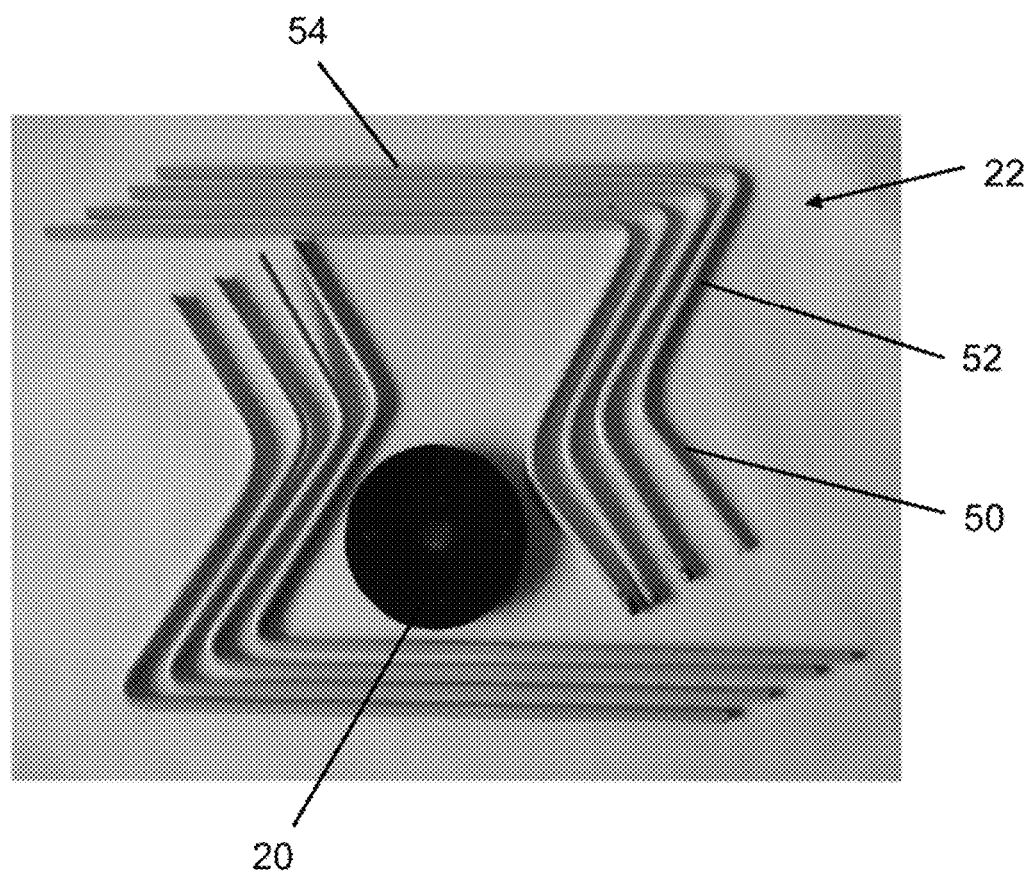
FIG. 6 is a top view of the pumpkin display in a disassembled configuration.

In use, the pumpkin display 14 is initially in a storage configuration, which is illustrated in FIG. 6, where the components of the pumpkin display 14 are substantially flat. The storage configuration facilitates packaging the pumpkin display 14 in a relatively dense configuration, which minimizes the amount of packaging material that is needed to enclose the pumpkin display 14 such as during shipping. The dense storage configuration also reduces the cost of shipping the pumpkin display 14 such as to customers.

The pumpkin display 14 is assembled by inserting the end of each leg 22 into each leg aperture 30 to form the pumpkin display 14 as illustrated in FIGS. 2-5. The pumpkin 12 is then placed on the pumpkin display 14 to form the pumpkin display system 10 as illustrated in FIG. 1. The pumpkin 12 may be secured to the pumpkin display 14 by extending rope or wire through the mounting apertures 40 and apertures formed in the pumpkin 12.

Alternatively or additionally, the pumpkin display 14 may be attached to a vertically oriented support rod by extending a fastener through a central opening 58 in the central hub 20. Using such a configuration enables the pumpkin display system 10 to be mounted above a ground surface to enhance the ability to see the pumpkin display system 10.

The support rod may be fabricated from a variety of materials and lengths using the concepts of the invention. The support rod should be mounted to the ground surface to minimize the potential of the support rod tipping over when the pumpkin display system 10 is attached thereto. A person of skill in the art will appreciate that there are a variety of techniques for mounting the support rod to the ground surface.

To further enhance the appearance of the pumpkin display system 10, the pumpkin 12 may be carved to form at least one opening 60 in a surface thereof or by painting or otherwise forming a design or image on the surface of the pumpkin 12 such as illustrated in FIG. 1.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A pumpkin display system comprising:
   a plurality of legs;
   a central hub having a plurality of apertures formed therein, wherein each of the apertures is adapted to receive an end of one of the plurality of legs to removably attach the plurality of legs to the central hub and form a pumpkin display; and
   a pumpkin placed onto and supported by the pumpkin display to form the pumpkin display system, wherein at least one of the legs flexes when the pumpkin is placed on the pumpkin display and wherein flexing of at least one of the legs causes the plurality of legs to contact the pumpkin; wherein central hub further comprises an upper surface, a lower surface and a side surface that extends between the upper surface and the lower surface and wherein the plurality of apertures are formed in a side surface of the central hub, wherein the upper surface, the lower surface and the side surface are unitary.

2. The pumpkin display system of claim 1, wherein each of the legs comprises a first leg section, a second leg section and a third leg section, wherein the second leg section extends from the first leg section, wherein the second leg section is oriented at an angle with respect to the first leg section, wherein the third leg section extends from an end of the second leg section that is opposite the first leg section, wherein the third leg section is oriented at an angle with respect to the second leg section, wherein the second leg section has a length that is about two times longer than a length of the first leg section and wherein the third leg section has a length that is about two times longer than the length of the second leg section.

3. The pumpkin display system of claim 1, wherein the central hub comprises a first side and a second side that is opposite the first side, wherein the first side and the second side are both located on the side surface and wherein a first portion of the plurality of legs that extend from the first side is generally symmetrical to a second portion of the plurality of legs that extend from the second side.

4. The pumpkin display system of claim 1, wherein the end of each legs that extends into the aperture is oriented substantially parallel to at least one of the upper surface and the lower surface.

5. The pumpkin display system of claim 1, wherein each aperture has a shape that is similar to a shape of the end of the leg that extends into the aperture.

6. The pumpkin display system of claim 1, wherein the aperture and the end of the leg that extends into the aperture both have a non-circular profile.

7. The pumpkin display system of claim 1, wherein each aperture has a first diameter, wherein the end of the leg that extends into the aperture has a second diameter and wherein the second diameter is larger than the first diameter.

8. The pumpkin display system of claim 1, wherein at least one of the aperture and the end of the leg that extends into the aperture have an enhanced friction surface.

9. The pumpkin display system of claim 1, wherein the central hub has a hole formed therein that extends from the upper surface thereof to the lower surface thereof and wherein the pumpkin display system further comprises a fixation device that is extendable through the hole and into the pumpkin to retain the pumpkin in a substantially stationary position with respect to the pumpkin display.

10. A pumpkin display system comprising:
    a plurality of legs;
    a central hub having a plurality of apertures formed therein, wherein each of the apertures is adapted to receive an end of one of the plurality of legs to removably attach the plurality of legs to the central hub and form a pumpkin display; and
    a pumpkin placed onto and supported by the pumpkin display to form the pumpkin display system, wherein the central hub is fabricated from a material that flexes such that an orientation of the legs with respect to the central hub changes when the pumpkin is placed on the pumpkin display and wherein flexing of the central hub causes the plurality of legs to each contact the pumpkin; wherein central hub further comprises an upper surface, a lower surface and a side surface that extends between the upper surface and the lower surface and wherein the plurality of apertures are formed in a side surface of the central hub, wherein the upper surface, the lower surface and the side surface are unitary.

11. The pumpkin display system of claim 10, wherein the aperture and the end of the leg that extends into the aperture both have a non-circular profile.

12. A method of forming a pumpkin display system comprising:
    providing a central hub having a plurality of apertures formed therein;
    providing a plurality of legs;
    extending an end of each leg into one of the plurality of apertures to removably attach the plurality of legs to the central hub and form a pumpkin display;
    placing a pumpkin on the pumpkin display, wherein the pumpkin display supports the pumpkin above a surface on which the pumpkin display is placed;
    flexing at least one of the plurality of legs when the pumpkin is placed on the pumpkin display; and
    contacting the pumpkin with the plurality of legs to retain the pumpkin in a substantially stationary position on the pumpkin display; wherein central hub further comprises an upper surface, a lower surface and a side surface that extends between the upper surface and the lower surface and wherein the plurality of apertures are formed in a side surface of the central hub, wherein the upper surface, the lower surface and the side surface are unitary.

13. The method of claim 12, wherein each of the legs comprises a first leg section, a second leg section and a third leg section, wherein the second leg section extends from the first leg section, wherein the second leg section is oriented at an angle with respect to the first leg section, wherein the third leg section extends from an end of the second leg section that is opposite the first leg section, wherein the third leg section is oriented at an angle with respect to the second leg section, wherein the second leg section has a length that is about two times longer than a length of the first leg section, wherein the third leg section has a length that is about two times longer than the length of the second leg section and wherein the method further comprises forming each aperture with a shape that is similar to a shape of an end of the leg that extends into the aperture.

14. The method of claim 13, wherein the method further comprises forming the aperture and the end of the leg that extends into the aperture with a non-circular profile.

15. The method of claim 12, wherein the method further comprises:
   forming each aperture with a first diameter; and
   forming each end of the plurality of legs that extends into the aperture with a second diameter, wherein the second diameter is larger than the first diameter.

16. The method of claim 12, and further comprising providing an enhanced friction surface on at least one of the aperture and the end of the leg that extends into the aperture to retain the leg in a substantially stationary position with respect to the central hub.

17. The method of claim 12, wherein the central hub has a hole formed therein that extends from the upper surface thereof to the lower surface thereof and wherein the method further comprises extending a fixation device through the hole and into the pumpkin to retain the pumpkin in a substantially stationary position on the pumpkin display.

18. A method of forming a pumpkin display system comprising:
   providing a central hub having a plurality of apertures formed therein;
   providing a plurality of legs;
   extending an end of each leg into one of the plurality of apertures to removably attach the plurality of legs to the central hub and form a pumpkin display;
   placing a pumpkin on the pumpkin display, wherein the pumpkin display supports the pumpkin above a surface on which the pumpkin display is placed;
   flexing of the central hub to change an orientation of the legs with respect to the central hub when the pumpkin is placed on the pumpkin display; and
   contacting the pumpkin with the plurality of legs to retain the pumpkin in a substantially stationary position on the pumpkin display; wherein central hub further comprises an upper surface, a lower surface and a side surface that extends between the upper surface and the lower surface and wherein the plurality of apertures are formed in a side surface of the central hub, wherein the upper surface, the lower surface and the side surface are unitary.

19. The method of claim 18, wherein the method further comprises forming the aperture and the end of the leg that extends into the aperture with a non-circular profile.

* * * * *